US012495328B2

(12) United States Patent
Yu et al.

(10) Patent No.: US 12,495,328 B2
(45) Date of Patent: Dec. 9, 2025

(54) PHYSICAL LAYER PROTOCOL DATA UNIT (PPDU) FORMAT FOR REDUCING PREAMBLE OVERHEAD OF PREEMPTION PPDUS

(71) Applicant: NEWRACOM, Inc., Irvine, CA (US)

(72) Inventors: Heejung Yu, Daejeon (KR); Joonsoo Lee, Seoul (KR); Si-Chan Noh, Seoul (KR); Il-Gu Lee, Seoul (KR)

(73) Assignee: NEWRACOM, Inc., Irvine, CA (US)

( * ) Notice: Subject to any disclaimer, the term of this patent is extended or adjusted under 35 U.S.C. 154(b) by 20 days.

(21) Appl. No.: 18/804,512

(22) Filed: Aug. 14, 2024

(65) Prior Publication Data

US 2025/0081034 A1 Mar. 6, 2025

Related U.S. Application Data

(60) Provisional application No. 63/580,686, filed on Sep. 5, 2023.

(51) Int. Cl.
*H04W 28/02* (2009.01)
(52) U.S. Cl.
CPC ............................. *H04W 28/0289* (2013.01)
(58) Field of Classification Search
None
See application file for complete search history.

(56) References Cited

U.S. PATENT DOCUMENTS

| 2023/0081745 | A1* | 3/2023 | Xin | H04W 74/0816 |
| | | | | 370/328 |
| 2023/0397249 | A1* | 12/2023 | Fang | H04W 74/0808 |
| 2023/0412711 | A1* | 12/2023 | Fang | H04L 69/22 |
| 2025/0063596 | A1* | 2/2025 | Ajami | H04W 74/0816 |
| 2025/0132871 | A1* | 4/2025 | Ho | H04W 74/08 |

OTHER PUBLICATIONS

IEEE 802.11-2020: "Part 11: Wireless LAN Medium Access Control (MAC) and Physical Layer (PHY) Specifications," IEEE Standard for Information technology—Telecommunications and information exchange between systems Local and metropolitan area networks—Specific requirements, Dec. 3, 2020, 4379 pages.

(Continued)

*Primary Examiner* — Quang N Nguyen
(74) *Attorney, Agent, or Firm* — Nicholson, De Vos, Webster & Elliott, LLP

(57) ABSTRACT

An embodiment is method performed by a wireless device to allow preemption in a wireless network. The method includes wirelessly transmitting a first preemption physical layer protocol data unit (PPDU) that includes a complete preamble followed by one or more subsequent preemption PPDUs that each include a reduced preamble, wherein the complete preamble includes one or more preamble fields that are omitted in the reduced preamble, wherein the first PPDU and the one or more subsequent preemption PPDUs are transmitted with a predefined interframe space interval between PPDU transmissions during which preemption is allowed.

19 Claims, 20 Drawing Sheets

(56) References Cited

OTHER PUBLICATIONS

IEEE 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE 802.11ax-2021: "Part 11: Wireless LAN Medium Access Control (MAC) and Physical Layer (PHY) Specifications, Amendment 1: Enhancements for High-Efficiency WLAN," IEEE Standard for Information technology—Telecommunications and information exchange between systems Local and metropolitan area networks—Specific requirements, published 2021, 767 pages.

IEEE 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

IEEE 802.11bd-2022: "Part 11: Wireless LAN Medium Access Control (MAC) and Physical Layer (PHY) Specifications, Amendment 5: Enhancements for Next Generation V2X," IEEE Standard for Information technology—Telecommunications and information exchange between systems Local and metropolitan area networks—Specific requirements, published Mar. 10, 2023, 144 pages.

IEEE 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

IEEE 802.11p-2010: "Part 11: Wireless LAN Medium Access Control (MAC) and Physical Layer (PHY) Specifications, Amendment 6: Wireless Access in Vehicular Environments," IEEE Standard for Information technology—Telecommunications and information exchange between systems Local and metropolitan area networks—Specific requirements, Jul. 15, 2010, 51 pages.

IEEE P802.11be™/D4.0, "Part 11: Wireless LAN Medium Access Control (MAC) and Physical Layer (PHY) Specifications Amendment 8: Enhancements for extremely high throughput (EHT)", Draft Standard for Information technology—Telecommunications and information exchange between systems Local and metropolitan area networks—Specific requirements, Jul. 2023, 1031 pages.

* cited by examiner

| IEEE Standard | Max PHY rate | PHY rate enhancement | Bandwidth/number of spatial streams (SS) | Operating bands |
|---|---|---|---|---|
| 802.11b | 11 Mbps | | 22 MHz, 1 SS | 2.4 GHz |
| 802.11a/g | 54 Mbps | 5 X | 20 MHz, 1 SS | 5 GHz (.a)/2.4 GHz(.g) |
| 802.11n | 600 Mbps | 11 X | 40 MHz, 4 SS | 2.4/5 GHz |
| 802.11ac | 6.9 Gbps | 11 X | 160 MHz, 8 SS | 5 GHz |
| 802.11ax | 9.6 Gbps | 1.4 X | 160 MHz, 8 SS | 2.4/5 GHz |
| 802.11be | 46 Gbps | 4.8 X | 320 MHz, 16 SS | 2.4/5/6 GHz |
| 802.11bn - Next Generation of 802.11 (UHR) | A Gbps | B X | TBD | TBD |

FIG. 6

| Part | Element | Definition | Duration | DFT period | GI | Subcarrier spacing |
|---|---|---|---|---|---|---|
| Legacy Part | Legacy(L)-STF | Non-high throughput(HT) Short Training field | 8 μs | - | - | equivalent to 1,250 kHz |
| | L-LTF | Non-HT Long Training field | 8 μs | 3.2 μs | 1.6 μs | 312.5 kHz |
| | L-SIG | Non-HT SIGNAL field | 4 μs | 3.2 μs | 0.8 μs | 312.5 kHz |
| | RL-SIG | Repeated Non-HT SIGNAL field | 4 μs | 3.2 μs | 0.8 μs | 312.5 kHz |
| | U-SIG | Universal SIGNAL field | 8 μs | 3.2 μs | 0.8 μs | 78.125 kHz |
| EHT Part | EHT-SIG | EHT SIGNAL field | 4 μs | 3.2 μs | 0.8 μs | 78.125 kHz |
| | EHT-STF-T | EHT Short Training field for TB PPDU | 8 μs | - | - | 78.125 kHz |
| | EHT-STF-NT | EHT Short Training field for MU PPDU | 4 μs | - | - | 78.125 kHz |
| | EHT-LTF | EHT Long Training field | 4 μs, 8 μs, 16 μs | 3.2 μs, 6.4 μs, 12.8 μs | 0.8 μs, 1.6 μs, and 3.2 μs. | 78.125 kHz |
| | EHT-DATA | Data field carrying the PSDU(s) | 13.6 μs, 14.4 μs, 16 μs | 12.8 μs | 0.8 μs, 1.6 μs, and 3.2 μs. | 78.125 kHz |
| UHR Part | TBD | TBD | TBD | TBD | TBD | TBD |

FIG. 7

Preemption PPDU #1: L-STF 1305 | L-LTF 1310 | L-SIG 1315 | RL-SIG 1320 | U-SIG 1325 | UHR-SIG 1330 | UHR-STF 1335 | UHR-LTF1 1340-1 | UHR-LTF2 1340-2 | ... | UHR-LTF N 1340-N | Data 1345 | PE 1350

Preemption PPDU #2-Last: L-SIG 1415 | RL-SIG 1420 | U-SIG 1425 | UHR-SIG 1430 | UHR-STF 1435 | UHR-LTF1 1440-1 | UHR-LTF2 1440-2 | ... | UHR-LTF N 1440-N | Data 1445 | PE 1450

Reduced Preamble

FIG. 14

Preemption PPDU #1: L-STF 1305 | L-LTF 1310 | L-SIG 1315 | RL-SIG 1320 | U-SIG 1325 | UHR-SIG 1330 | UHR-STF 1335 | UHR-LTF1 1340-1 | UHR-LTF2 1340-2 | ... | UHR-LTF N 1340-N | Data 1345 | PE 1350

Preemption PPDU #2-Last: U-SIG 1525 | UHR-SIG 1530 | UHR-STF 1535 | UHR-LTF1 1540-1 | UHR-LTF2 1540-2 | ... | UHR-LTF N 1540-N | Data 1545 | PE 1550

Reduced Preamble

FIG. 15

```
                                            ┌─2000
┌─────────────────────────────────────────────────────────────────────────────┐
│ WIRELESSLY RECEIVE A FIRST PREEMPTION PPDU THAT INCLUDES A COMPLETE PREAMBLE│
│ FOLLOWED BY ONE OR MORE SUBSEQUENT PREEMPTION PPDUS THAT EACH INCLUDE A     │
│ REDUCED PREAMBLE, WHEREIN THE COMPLETE PREAMBLE INCLUDES ONE OR MORE        │
│ PREAMBLE FIELDS THAT ARE OMITTED IN THE REDUCED PREAMBLE, WHEREIN THE FIRST │
│ PREEMPTION PPDU AND THE ONE OR MORE SUBSEQUENT PREEMPTION PPDUS WERE        │
│ TRANSMITTED WITH A PREDEFINED INTERFRAME SPACE INTERVAL BETWEEN PPDU        │
│ TRANSMISSIONS TO ALLOW PREEMPTION                                           │
│                                   2005                                      │
└─────────────────────────────────────────────────────────────────────────────┘
                                        │
                                        ▼
┌─────────────────────────────────────────────────────────────────────────────┐
│  PROCESS THE FIRST PREEMPTION PPDU AND THE ONE OR MORE SUBSEQUENT PREEMPTION│
│                                     PPDUS                                   │
│                                     2010                                    │
│                                                                             │
│   IF REDUCED PREAMBLE OMITS L-STF PREAMBLE FIELD AND L-LTF PREAMBLE FIELD:  │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐│
│    PROCESS THE ONE OR MORE SUBSEQUENT PREEMPTION PPDUS USING SYNCHRONIZATION│
│  │ AND CHANNEL ESTIMATION INFORMATION OBTAINED FROM THE L-STF PREAMBLE    ││
│    FIELD AND L-LTF PREAMBLE FIELD INCLUDED IN THE COMPLETE PREAMBLE        │
│  │                                  2015                                  ││
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘│
│                                                                             │
│   IF REDUCED PREAMBLE OMITS L-SIG PREAMBLE FIELD:                           │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐│
│  │ PROCESS THE ONE OR MORE SUBSEQUENT PREEMPTION PPDUS USING INFORMATION  ││
│    OBTAINED FROM THE L-SIG PREAMBLE FIELD INCLUDED IN THE COMPLETE PREAMBLE │
│  │                                  2020                                  ││
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘│
│                                                                             │
│   IF REDUCED PREAMBLE OMITS U-SIG PREAMBLE FIELD OR PORTION OF U-SIG        │
│   PREAMBLE FIELD:                                                           │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐│
│  │ PROCESS THE ONE OR MORE SUBSEQUENT PREEMPTION PPDUS USING INFORMATION  ││
│    OBTAINED FROM THE U-SIG PREAMBLE FIELD INCLUDED IN THE COMPLETE PREAMBLE │
│  │                                  2025                                  ││
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘│
│                                                                             │
│   IF REDUCED PREAMBLE OMITS UHR-STF PREAMBLE FIELD:                         │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐│
│  │ PROCESS THE ONE OR MORE SUBSEQUENT PREEMPTION PPDUS WITHOUT PERFORMING ││
│                ADDITIONAL AUTOMATIC GAIN CONTROL (AGC)                      │
│  │                                  2030                                  ││
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘│
│                                                                             │
│   IF REDUCED PREAMBLE OMITS ONE OR MORE UHR-LTF PREAMBLE FIELDS:            │
│  ┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐│
│    PROCESS THE ONE OR MORE SUBSEQUENT PREEMPTION PPDUS USING MULTIPLE INPUT │
│  │ MULTIPLE OUTPUT (MIMO) CHANNEL ESTIMATION INFORMATION OBTAINED FROM THE││
│    ONE OR MORE UHR-LTF PREAMBLE FIELDS INCLUDED IN THE COMPLETE PREAMBLE    │
│  │                                  2035                                  ││
│  └ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘│
└─────────────────────────────────────────────────────────────────────────────┘
```

FIG. 20

PHYSICAL LAYER PROTOCOL DATA UNIT (PPDU) FORMAT FOR REDUCING PREAMBLE OVERHEAD OF PREEMPTION PPDUS

CROSS-REFERENCE TO RELATED APPLICATION

This application claims the benefit of U.S. Provisional Application No. 63/580,686 filed Sep. 5, 2023, which is hereby incorporated by reference.

TECHNICAL FIELD

The present disclosure generally relates to wireless communications, and more specifically, relates to a preemption physical layer protocol data unit (PPDU) format for reducing preamble overhead of preemption PPDUs.

BACKGROUND

Institute of Electrical and Electronics Engineers (IEEE) 802.11 is a set of standards for implementing wireless local area network communication in various frequencies, including but not limited to the 2.4 gigahertz (GHz), 5 GHZ, 6 GHZ, and 60 GHz bands. These standards define the protocols that enable Wi-Fi devices to communicate with each other. The IEEE 802.11 family of standards has evolved over time to accommodate higher data rates, improved security, and better performance in different environments. Some of the most widely used standards include 802.11a, 802.11b, 802.11g, 802.11n, 802.11ac, and 802.11ax (also known as "Wi-Fi 6"). These standards specify the modulation techniques, channel bandwidths, and other technical aspects that facilitate interoperability between devices from various manufacturers. IEEE 802.11 has played an important role in the widespread adoption of wireless networking in homes, offices, and public spaces, enabling users to connect their devices to the internet and each other without the need for wired connections.

IEEE 802.11be, also known as "Wi-Fi 7", is the next generation of the IEEE 802.11 family of standards for wireless local area networks. Currently under development, 802.11be aims to significantly improve upon the capabilities of its predecessor, 802.11ax/Wi-Fi 6, by offering even higher data rates, lower latency, and increased reliability. The standard is expected to leverage advanced technologies such as multi-link operation (MLO), which allows devices to simultaneously use multiple frequency bands and channels for enhanced performance and reliability. Additionally, 802.11be will introduce 4096-QAM (Quadrature Amplitude Modulation), enabling higher data rates by encoding more bits per symbol. The standard will also feature improved medium access control (MAC) efficiency, enhanced power saving capabilities, and better support for high-density environments. With these advancements, 802.11be is expected to deliver theoretical maximum data rates of up to 46 gigabits per second (Gbps), making it suitable for bandwidth-intensive applications such as virtual and augmented reality, 8 K video streaming, and high-performance gaming. The IEEE 802.11be standard is projected to be finalized by the end of 2024, paving the way for the next generation of Wi-Fi devices and networks.

One of the objectives of future wireless networking standards (e.g., beyond IEEE 802.11be wireless networking standard or IEEE 802.11bn), is to provide low latency services for real-time data. To allow low latency transmissions, a wireless device may divide a large physical layer protocol data unit (PPDU) into multiple smaller PPDUs (which may be referred to as preemption PPDUs) and transmit the multiple smaller preemption PPDUs with a predefined interframe space (IFS) interval between PPDU transmissions during which other wireless devices are allowed to preempt the transmission to transmit low latency data. However, with such a preemption scheme, each preemption PPDU includes a relatively large preamble, which reduces the overall throughput due to a large preamble overhead.

BRIEF DESCRIPTION OF THE DRAWINGS

The disclosure will be more fully understood from the detailed description provided below and the accompanying drawings that depict various embodiments of the disclosure. However, these drawings should not be interpreted as limiting the disclosure to the specific embodiments shown; they are provided for explanation and understanding only.

FIG. 6 illustrates maximum physical layer (PHY) rates for Institute of Electrical and Electronics Engineers (IEEE) 802.11 standards, in accordance with some embodiments of the present disclosure.

FIG. 7 provides a detailed description of fields in Extremely High Throughput (EHT) Physical Protocol Data Unit (PPDU) frames, including their purposes and characteristics, in accordance with some embodiments of the present disclosure.

FIG. 14 is a diagram showing a first example of a preemption PPDU format, according to some embodiments.

FIG. 15 is a diagram showing a second example of a preemption PPDU format, according to some embodiments.

FIG. 20 is a flowchart of a method for processing preemption PPDUs, according to some embodiments.

DETAILED DESCRIPTION

Figure 1:
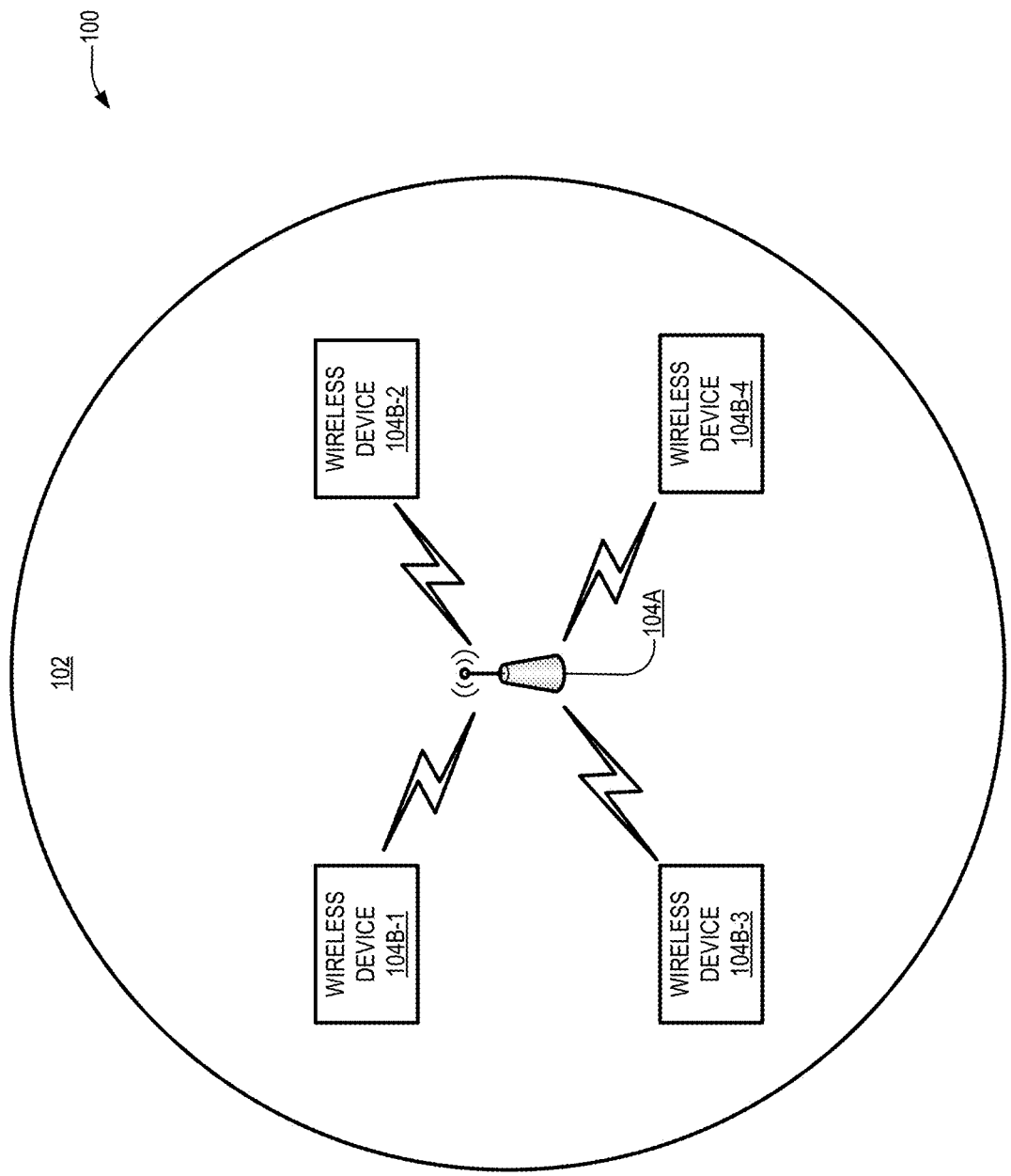
FIG. 1 illustrates an example of a wireless local area network (WLAN) with a basic service set (BSS) that includes multiple wireless devices, in accordance with some embodiments of the present disclosure.

The present disclosure generally relates to wireless communications, and more specifically, relates to a physical layer protocol data unit (PPDU) format for reducing preamble overhead of preemption PPDUs.

As mentioned above, with a preemption transmission scheme, a wireless device may transmit multiple smaller PPDUs (which may be referred to as preemption PPDUs) with a predefined interframe space (IFS) interval between PPDU transmissions during which other wireless devices are allowed to preempt the transmission to transmit low latency data. However, as mentioned above, with such a preemption scheme, each preemption PPDU includes a relatively large preamble, which reduces the overall throughput due to a large preamble overhead.

The present disclosure describes PPDU formats for reducing the preamble overhead of preemption PPDUs. According to some embodiments, only the first transmitted preemption PPDU includes a complete preamble and subsequent preemption PPDUs include a reduced preamble. The complete preamble may include one or more preamble fields that are omitted in the reduced preamble. Stated differently, the reduced preamble may omit one or more preamble fields included in the complete preamble. Since all of the preemption PPDUs are transmitted to the same destination, the recipient of the preemption PPDUs may leverage information obtained from the complete preamble included in the first PPDU to process the subsequent preemption PPDUs, thereby avoiding the need for including the complete preamble in all of the preemption PPDUs. By including the reduced preamble (instead of the complete preamble) in the subsequent preemption PPDUs, the overall throughput of the preemption PPDUs may be increased due to lower preamble overhead.

An embodiment is a method performed by a wireless device to allow preemption in a wireless network. The method includes wirelessly transmitting a first PPDU that includes a complete preamble followed by one or more subsequent preemption PPDUs that each include a reduced preamble. The complete preamble may include one or more preamble fields that are omitted in the reduced preamble. The first preemption PPDU and the one or more subsequent preemption PPDUs may be transmitted with a predefined interframe space interval between PPDU transmissions during which preemption is allowed.

An embodiment is a method performed by a wireless device to process preemption PPDUs. The method includes wirelessly receiving a first preemption PPDU that includes a complete preamble followed by one or more subsequent preemption PPDUs that each include a reduced preamble. The complete preamble may include one or more preamble fields that are omitted in the reduced preamble. The first PPDU and the one or more subsequent preemption PPDUs may have been transmitted with a predefined interframe space interval between PPDU transmissions to allow preemption. The method may further include processing the first preemption PPDU and the one or more subsequent preemption PPDUs. The one or more subsequent preemption PPDUs may be processed using information obtained from the complete preamble included in the first preemption PPDU.

For purposes of illustration, various embodiments are described herein in the context of wireless networks that are based on IEEE 802.11 standards and using terminology and concepts thereof. Those skilled in the art will appreciate that the embodiments disclosed herein can be modified/adapted for use in other types of wireless networks.

In the following detailed description, only certain embodiments of the present invention have been shown and described, simply by way of illustration. As those skilled in the art would realize, the described embodiments may be modified in different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B$_1$-104B$_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B$_1$-104B$_4$) may be collectively referred to as STAs. However, for ease of description, only the non-AP STAs may be referred to as STAs unless the context indicates otherwise. Although shown with four non-AP STAs (e.g., the wireless devices 104B$_1$-104B$_4$), the WLAN 100 may include any number of non-AP STAs (e.g., one or more wireless devices 104B).

Figure 2:
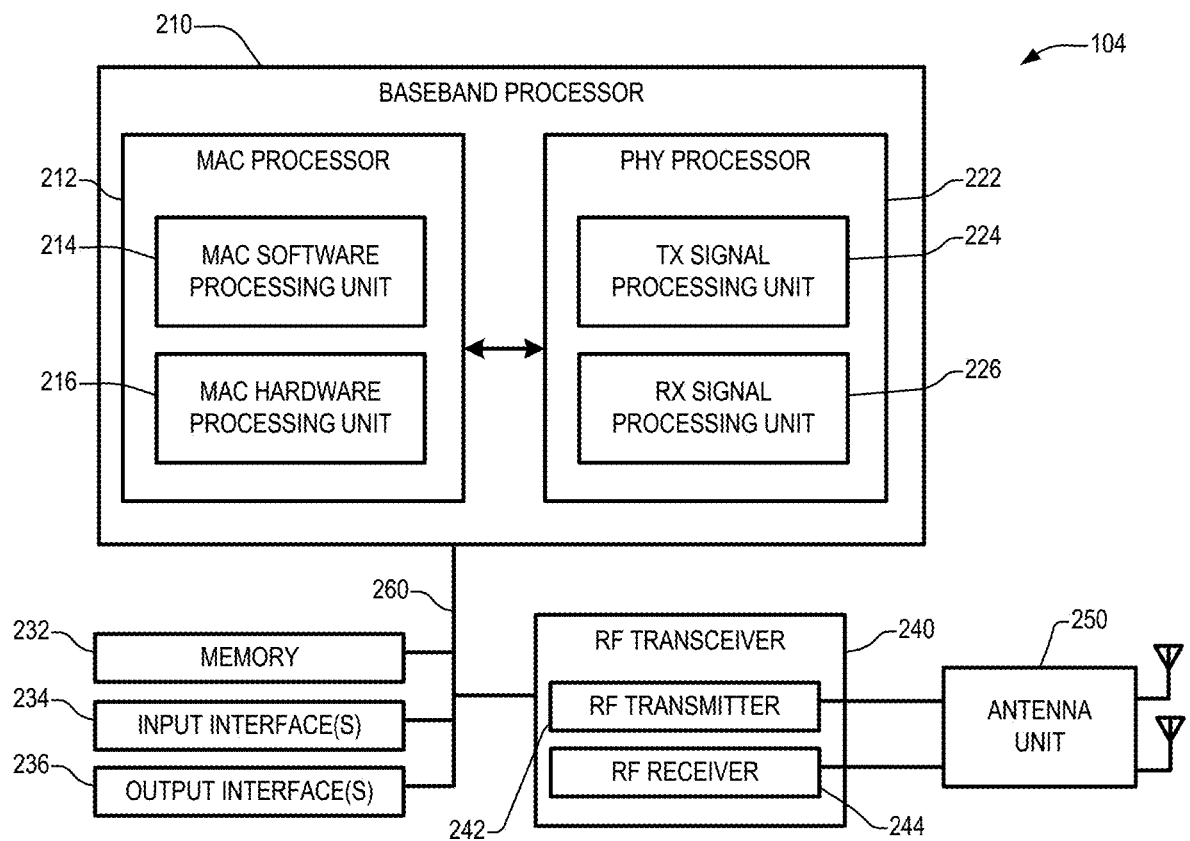
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104B₁-104B₄ in FIG. 1. The wireless device 104 includes a baseband processor 210, a radio frequency (RF) transceiver 240, an antenna unit 250, a storage device (e.g., memory device) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
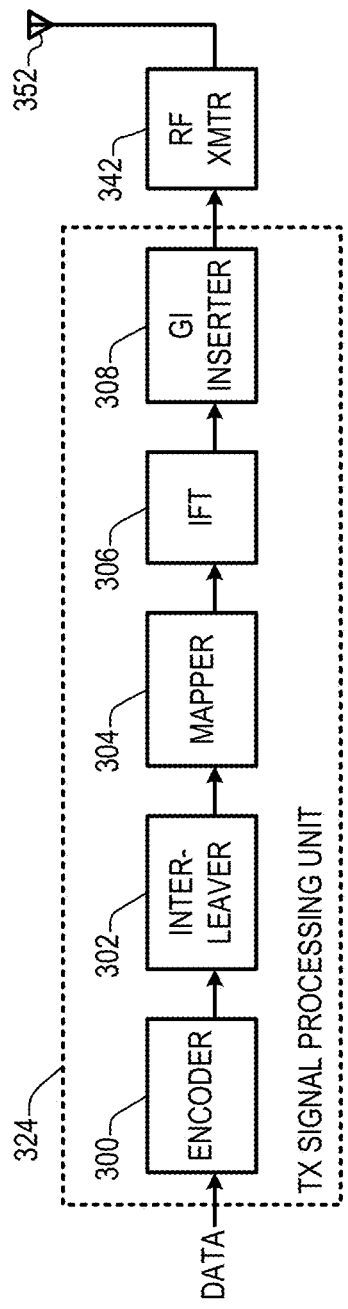
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0 s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
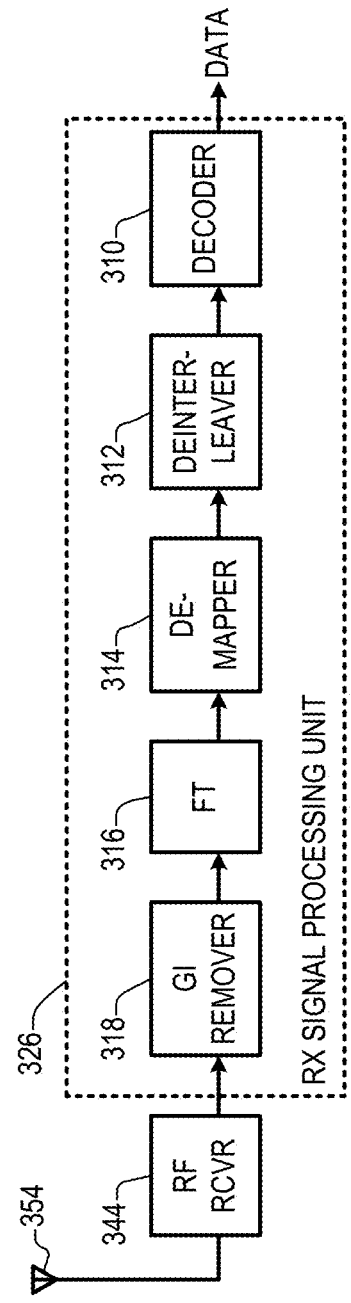
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) (also referred to as PLCP (Physical Layer Convergence Procedure) Protocol Data Units) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHZ, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
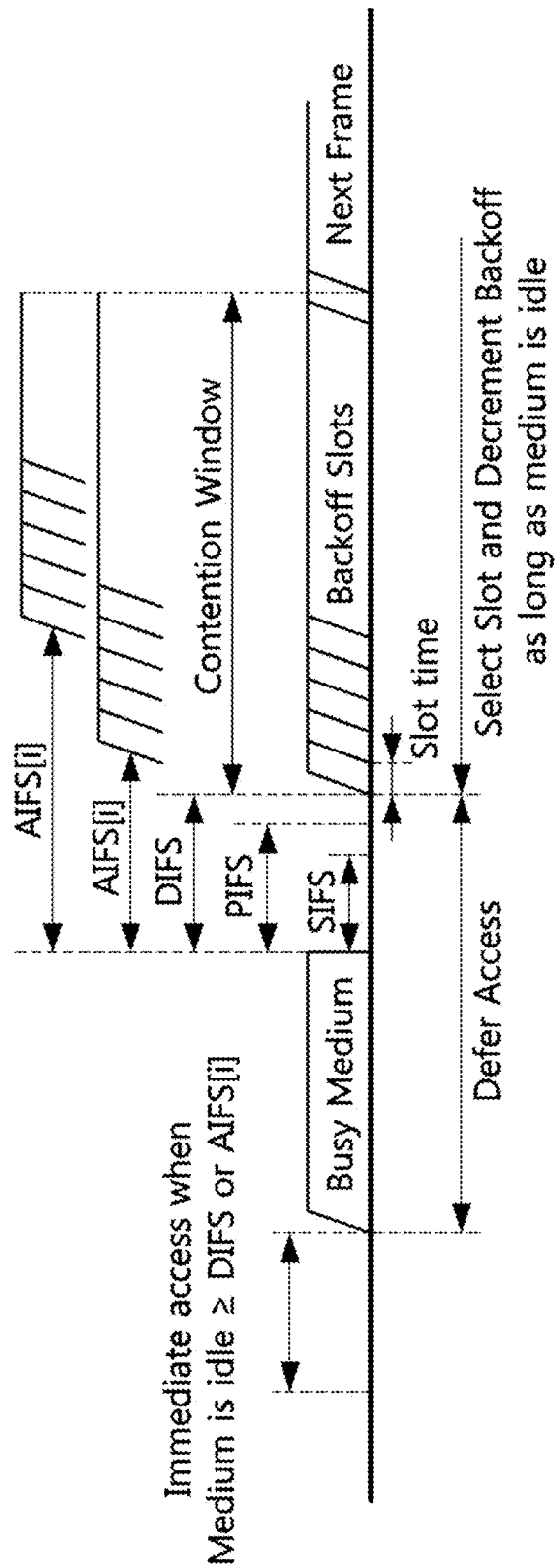
FIG. 4 illustrates interframe space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
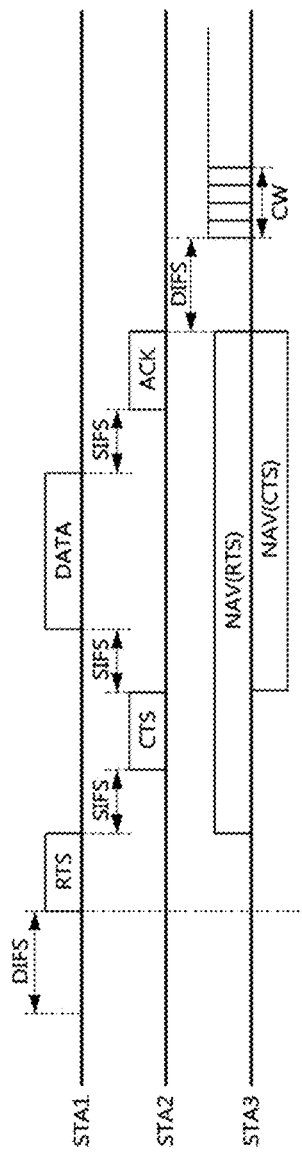
FIG. 5 illustrates a Carrier Sense Multiple Access with Collision Avoidance (CSMA/CA)-based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+ SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

The IEEE 802.11bn (Ultra High Reliability, UHR) working group has been established to address the growing demand for higher peak throughput and reliability in Wi-Fi. As shown in FIG. 6, the peak PHY rate has significantly increased from IEEE 802.11b to IEEE 802.11be (Wi-Fi 7), with the latter focusing on further improving peak throughput. The UHR study group aims to enhance the tail of the latency distribution and jitter to support applications that require low latency, such as video-over-WLAN, gaming, AR, and VR. It is noted that various characteristics of UHR (e.g., max PHY rate, PHY rate enhancement, bandwidth/ number of spatial streams, and operating bands) are still to be determined.

The focus of IEEE 802.11be is primarily on WLAN indoor and outdoor operation with stationary and pedestrian speeds in the 2.4, 5, and 6 GHz frequency bands. In addition to peak PHY rate, different candidate features are under discussion. These candidate features include (1) a 320 MHz bandwidth and a more efficient utilization of a non-contiguous spectrum, (2) multi-band/multi-channel aggregation and operation, (3) 16 spatial streams and Multiple Input Multiple Output (MIMO) protocol enhancements, (4) multi-Access Point (AP) Coordination (e.g., coordinated and joint transmission), (5) an enhanced link adaptation and retransmission protocol (e.g., Hybrid Automatic Repeat Request (HARQ)), and (6) adaptation to regulatory rules specific to a 6 GHz spectrum.

The focus of IEEE 802.11bn (UHR) is still under discussion, with candidate features including MLO enhancements (e.g., in terms of increased throughput/reliability and decreased latency), latency and reliability improvements (e.g., multi-AP coordination to support low latency traffic), bandwidth expansion (e.g., to 240, 480, 640 MHZ), aggregated PPDU (A-PPDU), enhanced multi-link single-radio (eMLSR) extensions to AP, roaming improvements, and power-saving schemes for prolonging battery life.

Some features, such as increasing the bandwidth and the number of spatial streams, are solutions that have been proven to be effective in previous projects focused on increasing link throughput and on which feasibility demonstration is achievable.

With respect to operational bands (e.g., 2.4/5/6 GHZ) for IEEE 802.11be, more than 1 GHz of additional unlicensed spectrum is likely to be available because the 6 GHz band (5.925-7.125 GHZ) is being considered for unlicensed use. This would allow APs and STAs to become tri-band devices. Larger than 160 MHz data transmissions (e.g., 320 MHz or 640 MHZ) could be considered to increase the maximum PHY rate. For example, 320 MHZ or 160+160 MHz data could be transmitted in the 6 GHz band. For example, 160+160 MHz data could be transmitted across the 5 and 6 GHz bands.

In the process of wireless communication, a transmitting station (STA) creates a Physical Layer Protocol Data Unit (PPDU) frame and sends it to a receiving STA. The receiving STA then receives, detects, and processes the PPDU.

The Extremely High Throughput (EHT) PPDU frame encompasses several components. It includes a legacy part, which comprises fields such as the Legacy Short Training Field (L-STF), Legacy Long Training Field (L-LTF), Legacy Signal Field (L-SIG), and Repeated Legacy Signal Field (RL-SIG). These fields are used to maintain compatibility with older Wi-Fi standards.

In addition to the legacy part, the EHT PPDU frame also contains the Universal Signal Field (U-SIG), EHT Signal Field (EHT-SIG), EHT Short Training Field (EHT-STF), and EHT Long Training Field (EHT-LTF). These fields are specific to the EHT standard and are used for various purposes, such as signaling, synchronization, and channel estimation.

FIG. 7 provides a more detailed description of each field in the EHT PPDU frame, including their purposes and characteristics.

Regarding the Ultra High Reliability (UHR) PPDU, its frame structure is currently undefined and will be determined through further discussions within the relevant working group or study group. This indicates that the specifics of the UHR PPDU are still under development and will be finalized based on the outcomes of future deliberations.

The distributed nature of channel access networks, such as IEEE 802.11 WLANs, makes the carrier sense mechanism useful for ensuring collision-free operation. Each station (STA) uses its physical carrier sense to detect transmissions from other STAs. However, in certain situations, it may not be possible for a STA to detect every transmission. For instance, when one STA is located far away from another STA, it might perceive the medium as idle and start transmitting a frame, leading to collisions. To mitigate this hidden node problem, the network allocation vector (NAV) has been introduced.

As the IEEE 802.11 standard continues to evolve, it now includes scenarios where multiple users can simultaneously transmit or receive data within a basic service set (BSS), such as uplink (UL) and downlink (DL) multi-user (MU) transmissions in a cascaded manner. In these cases, the existing carrier sense and NAV mechanisms may not be sufficient, and modifications or newly defined mechanisms may be required to facilitate efficient and collision-free operation.

For the purpose of this disclosure, MU transmission refers to situations where multiple frames are transmitted to or from multiple STAs simultaneously using different resources. Examples of these resources include different frequency resources in Orthogonal Frequency Division Multiple Access (OFDMA) transmission and different spatial streams in Multi-User Multiple Input Multiple Output (MU-MIMO) transmission. Consequently, downlink OFDMA (DL-OFDMA), downlink MU-MIMO (DL-MU-MIMO), uplink OFDMA (UL-OFDMA), uplink MU-MIMO (UL-MU-MIMO), and OFDMA with MU-MIMO are all considered examples of MU transmission.

Figure 8:
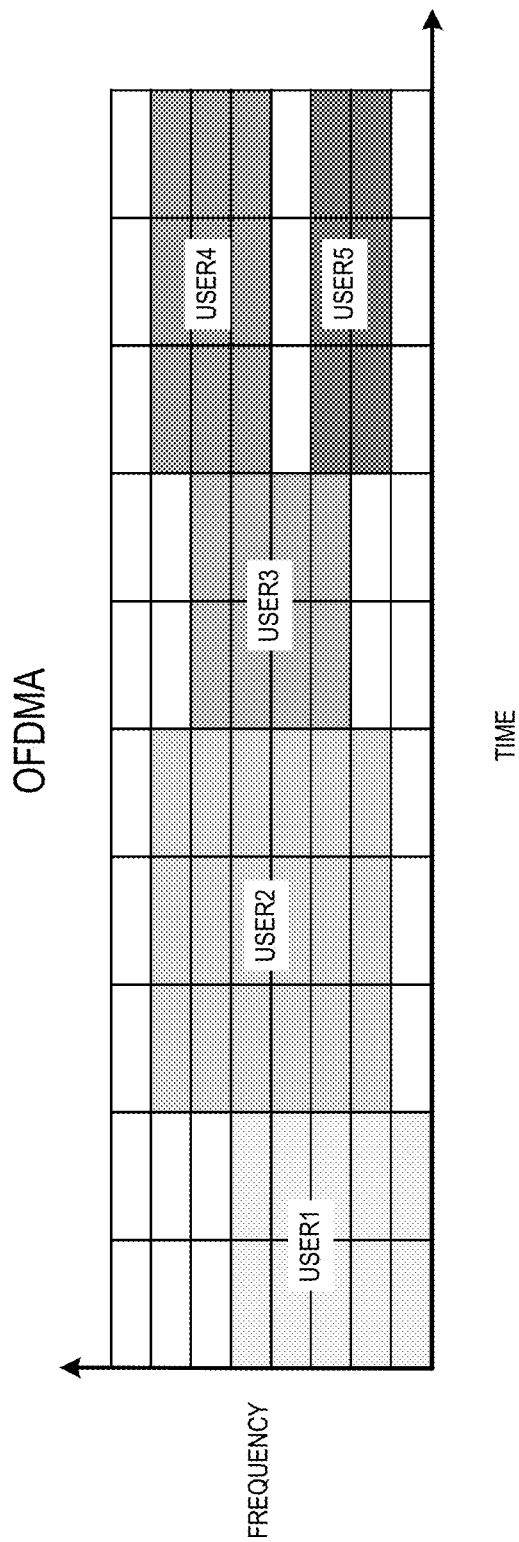
FIG. 8 illustrates an example of multi-user (MU) transmission in Orthogonal Frequency-Division Multiple Access (OFDMA), in accordance with some embodiments of the present disclosure.

FIG. 8 illustrates an example of multi-user (MU) transmission in Orthogonal Frequency-Division Multiple Access (OFDMA), in accordance with some embodiments of the present disclosure.

In the IEEE 802.11ax and 802.11be specifications, the trigger frame plays a useful role in facilitating uplink multi-user (MU) transmissions. The purpose of the trigger frame is to allocate resources and solicit one or more Trigger-based (TB) Physical Layer Protocol Data Unit (PPDU) transmissions from the associated stations (STAs).

The trigger frame contains information required by the responding STAs to send their Uplink TB PPDUs. This information includes the Trigger type, which specifies the type of TB PPDU expected, and the Uplink Length (UL Length), which indicates the duration of the uplink transmission.

Figure 9:
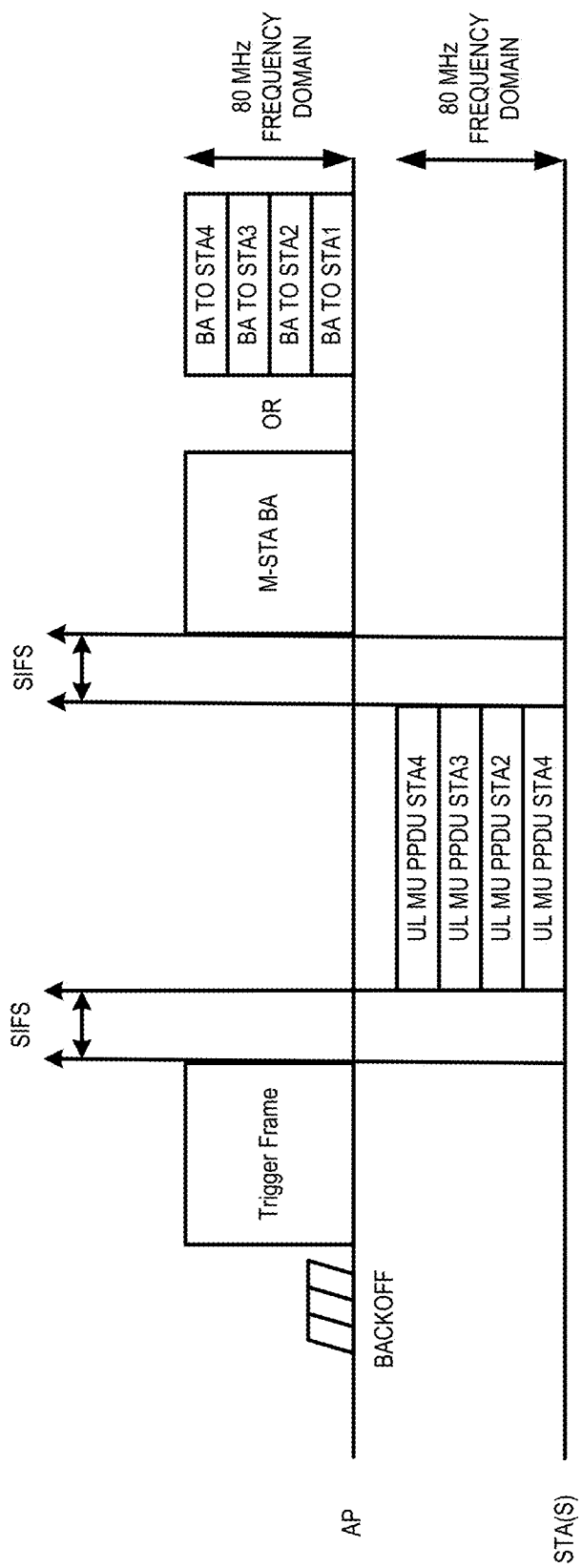
FIG. 9 illustrates an example of an access point sending a trigger frame to multiple associated stations and receiving Uplink Orthogonal Frequency-Division Multiple Access Trigger-Based Physical Protocol Data Units (UL OFDMA TB PPDUs) in response, in accordance with some embodiments of the present disclosure.

FIG. 9 illustrates an example scenario where an access point (AP) operating in an 80 MHz bandwidth environment sends a Trigger frame to multiple associated STAs. Upon receiving the Trigger frame, the STAs respond by sending their respective Uplink Orthogonal Frequency Division Multiple Access (UL OFDMA) TB PPDUs, utilizing the allocated resources within the specified 80 MHz bandwidth.

After successfully receiving the UL OFDMA TB PPDUs, the AP acknowledges the STAs by sending an acknowledgement frame. This acknowledgement can be in the form of an 80 MHz width multi-STA Block Acknowledgement (Block Ack) or a Block Acknowledgement with a Direct Feedback (DF) OFDMA method. The multi-STA Block Ack allows the AP to acknowledge multiple STAs simultaneously, while the Block Ack with DF OFDMA enables the AP to provide feedback to the STAs using the same OFDMA technique employed in the uplink transmission.

The trigger frame is a useful component in enabling efficient uplink MU transmissions in IEEE 802.11ax and 802.11be networks, by allocating resources and coordinating the uplink transmissions from multiple STAs within the same bandwidth.

Wireless network systems can rely on retransmission of media access control (MAC) protocol data units (MPDUs)

when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached. In particular, this scheme operates on a stop-and-wait protocol such that if the receiver can decode the packet, it sends an acknowledgement (ACK) to the transmitter. When the transmitter receives an ACK successfully, it terminates the HARQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

AP coordination has been considered as a potential technology to improve WLAN system throughput in the IEEE 802.11be standard and is still being discussed in the IEEE 802.11bn (UHR) standard. To support various AP coordination schemes, such as coordinated beamforming, OFDMA, TDMA, spatial reuse, and joint transmission, a predefined mechanism for APs is necessary.

In the context of coordinated TDMA (C-TDMA), the AP that obtains a transmit opportunity (TXOP) is referred to as the sharing AP. This AP initiates the AP coordination schemes to determine the AP candidate set by sending a frame, such as a Beacon frame or probe response frame, which includes information about the AP coordination scheme capabilities. The AP that participates in the AP coordination schemes after receiving the frame from the sharing AP is called the shared AP. The sharing AP is also known as the master AP or coordinating AP, while the shared AP is referred to as the slave AP or coordinated AP.

The operation of various AP coordination schemes has been discussed in the IEEE 802.11be and UHR standards:

Coordinated Beamforming (C-BF): Multiple APs transmit on the same frequency resource by coordinating and forming spatial nulls, allowing for simultaneous transmission from multiple APs.

Coordinated OFDMA (C-OFDMA): APs transmit on orthogonal frequency resources by coordinating and splitting the spectrum, enabling more efficient spectrum utilization.

Joint Transmission (JTX): Multiple APs transmit jointly to a given user simultaneously by sharing data between the APs.

Coordinated Spatial Reuse (C-SR): Multiple APs or STAs adjust their transmit power to reduce interference between APs.

By implementing these AP coordination schemes, WLAN systems can improve their overall throughput and efficiency by leveraging the cooperation between multiple APs.

Figure 10:
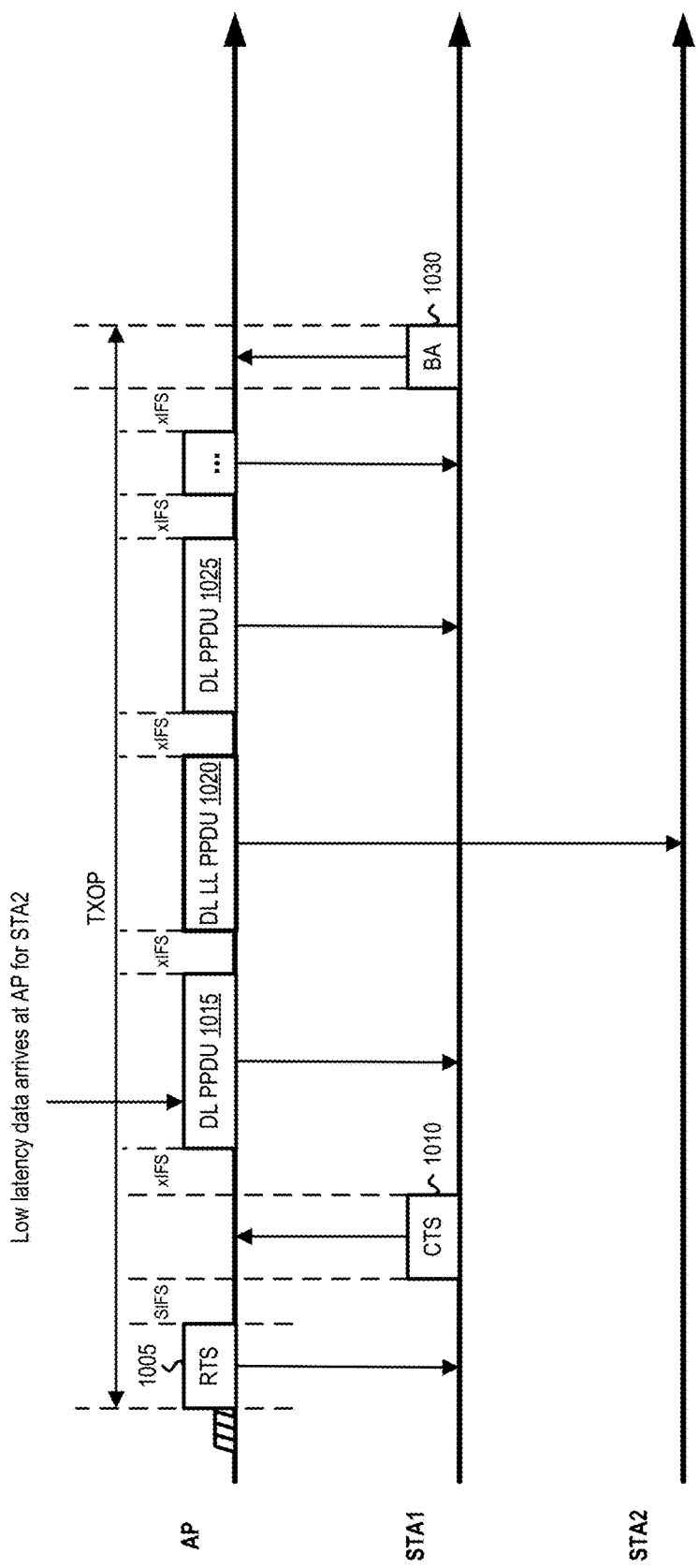
FIG. 10 is a diagram showing a frame exchange sequence where the transmission opportunity (TXOP) holder transmits preemption PPDUs and has low latency data to transmit, according to some embodiments.
Figure 11:
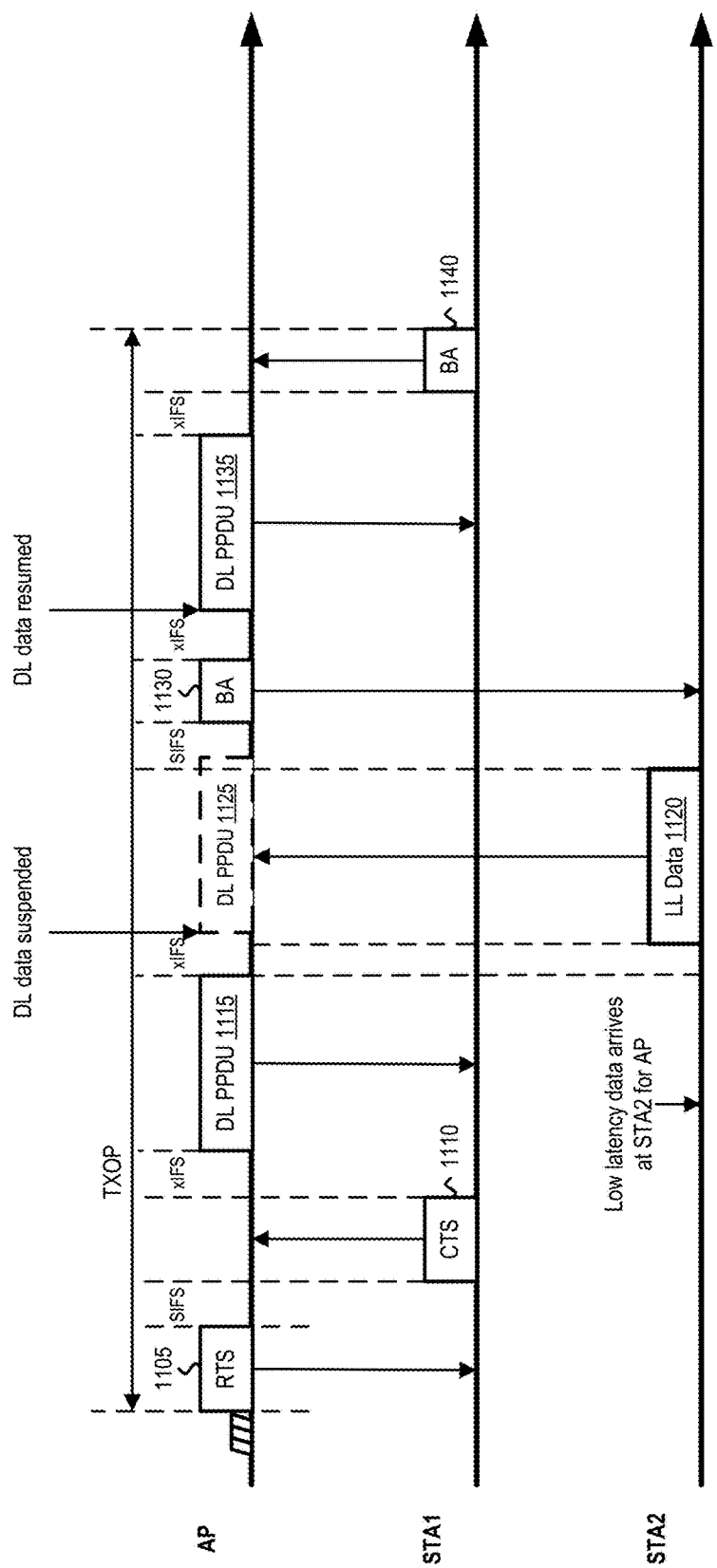
FIG. 11 is a diagram showing a frame exchange sequence where a non-TXOP holder has low latency data to transmit, according to some embodiments.

One of the objectives of future wireless networking standards (e.g., beyond IEEE 802.11be wireless networking standard or IEEE 802.11bn) is to provide low latency services for real-time data. If a wireless device transmits a large PPDU, other wireless devices that have low latency data to transmit cannot transmit their low latency data for a long time due to the busy channel condition. Thus, a wireless device that has low latency data to transmit has to wait for the large PPDU transmission to finish and then attempt channel access thereafter, which increases latency. A preemption scheme may be used to allow low latency transmission. With the preemption scheme, a wireless device may divide a large PPDU into multiple smaller PPDUs (referred to as preemption PPDUs) with a maximum length limitation and transmit the multiple smaller preemption PPDUs with a predefined IFS interval (e.g., xIFS interval) between PPDU transmissions during which other wireless devices can preempt the transmission to transmit low latency data. FIG. 10 and FIG. 11 are diagrams showing examples of the preemption scheme.

FIG. 10 is a diagram showing a frame exchange sequence where the transmission opportunity (TXOP) holder transmits preemption PPDUs and has low latency data to transmit, according to some embodiments.

The frame exchange sequence shown in the diagram involves an AP, a first STA (STA1), and a second STA (STA2). As shown in the diagram, following a backoff period, the AP may transmit a request to send (RTS) frame 1005 to STA1. Following a short interframe space (SIFS) interval after finishing reception of the RTS frame 1005, STA1 may transmit a clear to send (CTS) frame 1010 to the AP. The exchange of the RTS frame 1005 and CTS frame 1010 may establish a TXOP. The AP is the TXOP holder in this example. Following a xIFS interval after finishing reception of the CTS frame 1010, the AP may transmit downlink (DL) preemption PPDU 1015 to STA1. The xIFS interval may be a predefined IFS interval that is known to the AP and STAs (e.g., it may be defined in the wireless networking standard). During the middle of transmitting DL preemption PPDU 1015 to STA1, the AP may determine that it has low latency data to transmit to STA2. Low latency data may be emergency/urgent data or other type of data that needs to be transmitted with lower latency. As such, following a xIFS interval after finishing the transmission of DL preemption PPDU 1015, the AP may transmit DL low latency (LL) PPDU 1020 to STA2 in lieu of transmitting a DL preemption PPDU, thereby preempting its own transmission. DL LL PPDU 1020 may include the low latency data that AP has for STA2. Following a xIFS interval after finishing transmission of DL LL PPDU 1020, the AP may resume transmitting preemption PPDUs to STA1 including DL preemption PPDU 1025 and possibly additional preemption PPDUs, with a xIFS interval between PPDU transmissions during which preemption is allowed. Following a xIFS interval after finishing reception of the last DL preemption PPDU from the AP, STA1 may transmit a block acknowledgment (BA) frame 1030 to the AP that acknowledges the contents of the DL preemption PPDUs transmitted by the AP to STA1.

FIG. 11 is a diagram showing a frame exchange sequence where a non-TXOP holder has low latency data to transmit, according to some embodiments.

The frame exchange shown in the diagram involves an AP, a first STA (STA1), and a second STA (STA2). As shown in the diagram, following a backoff period, the AP may transmit a RTS frame 1105 to STA1. Following a SIFS interval after finishing reception of the RTS frame 1105, STA1 may transmit a CTS frame 1110 to the AP. The exchange of the RTS frame 1105 and CTS frame 1110 may establish a TXOP. The AP is the TXOP holder in this example. Following a xIFS interval after finishing reception of the CTS frame 1110, the AP may transmit DL preemption PPDU 1115 to STA1. During the middle of the AP transmitting DL preemption PPDU 1115 to STA1, STA2 may determine that it has low latency data to transmit to the AP. As such, during the xIFS interval that follows after the transmission of DL preemption PPDU 1115, STA2 may transmit LL data frame 1120 that includes the low latency data (that STA2 has for the AP) to the AP, thereby preempting the transmission of the AP. The AP may temporarily suspend the transmission of DL preemption PPDU 1125 to STA1 (depicted in the diagram by DL preemption PPDU 1125 having dashed lines) to receive LL data frame 1120 from STA2. Following a SIFS interval after finishing reception of LL data frame 1120, the AP may transmit a BA frame 1130 to STA2 that acknowledges LL data frame 1120. In this example, STA2 is a non-TXOP holder that has low latency data to transmit. Following a xIFS interval after finishing transmission of the BA frame 1130, the AP may resume transmission of DL preemption PPDUs, for example, by transmitting DL preemption PPDU 1135 to STA1. Following a xIFS interval after finishing reception of the last DL preemption PPDU 1135, STA1 may transmit a BA frame 1140 to the AP that acknowledges the contents of the DL preemption PPDUs transmitted by the AP to STA1.

Figure 12:
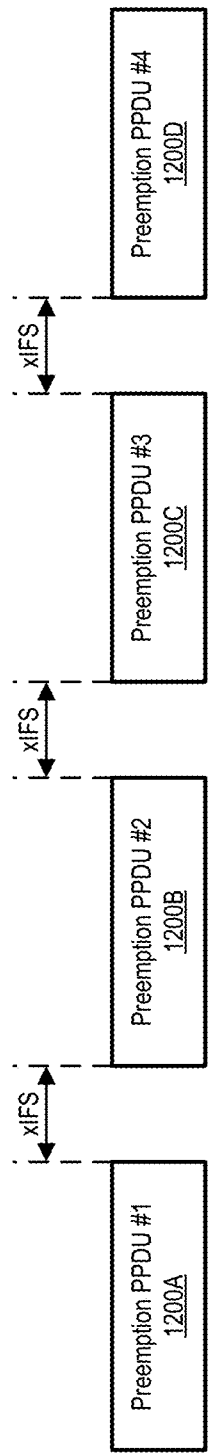
FIG. 12 is a diagram showing multiple preemption PPDUs being transmitted with a xIFS interval between PPDU transmissions, according to some embodiments.

FIG. 12 is a diagram showing multiple preemption PPDUs being transmitted with a xIFS interval between PPDU transmissions, according to some embodiments.

As shown in the diagram, multiple preemption PPDUs such as preemption PPDU #1 1200A, preemption PPDU #2 1200B, preemption PPDU #3 1200C, and preemption PPDU #4 1200D may be transmitted with a predefined IFS interval (xIFS interval) between PPDU transmissions. Preemption may be allowed during the xIFS intervals. In an embodiment, the xIFS interval is longer than the SIFS interval (e.g., the SIFS interval defined in the IEEE 802.11 wireless networking standards) but shorter than the distributed coordination function interframe space (DIFS) interval (e.g., the DIFS interval defined in the IEEE 802.11 wireless networking standards) (i.e., SIFS<xIFS<DIFS). In an embodiment, the xIFS interval has a duration that is a multiple of a OFDM symbol duration (e.g., n*(OFDM symbol duration), where n is a positive integer). Then, the xIFS interval can be regarded as OFDM symbols with zeroes in all subcarriers.

The source and destination of the multiple preemption PPDUs 1200 may be the same and the IFS interval between them may be constant. As such, as will be described in additional detail herein, only preemption PPDU #1 1200A may need to include a complete preamble, while the subsequent preemption PPDUs (e.g., preemption PPDU #2 1200B, preemption PPDU #3 1200C, and preemption PPDU #4 1200D) may include a reduced preamble to lower preamble overhead and achieve higher throughput. Several examples of a reduced preamble are presented herein. However, an example of a complete preamble is first provided as a reference point. While particular PPDU and preamble formats are presented and described herein, it should be appreciated that these are provided by way of example to aid the reader's understanding and not intended to be limiting. One of ordinary skill in the art will appreciate that other PPDU and/or preamble formats can be used to achieve the same/similar technical effect.

Figure 13:
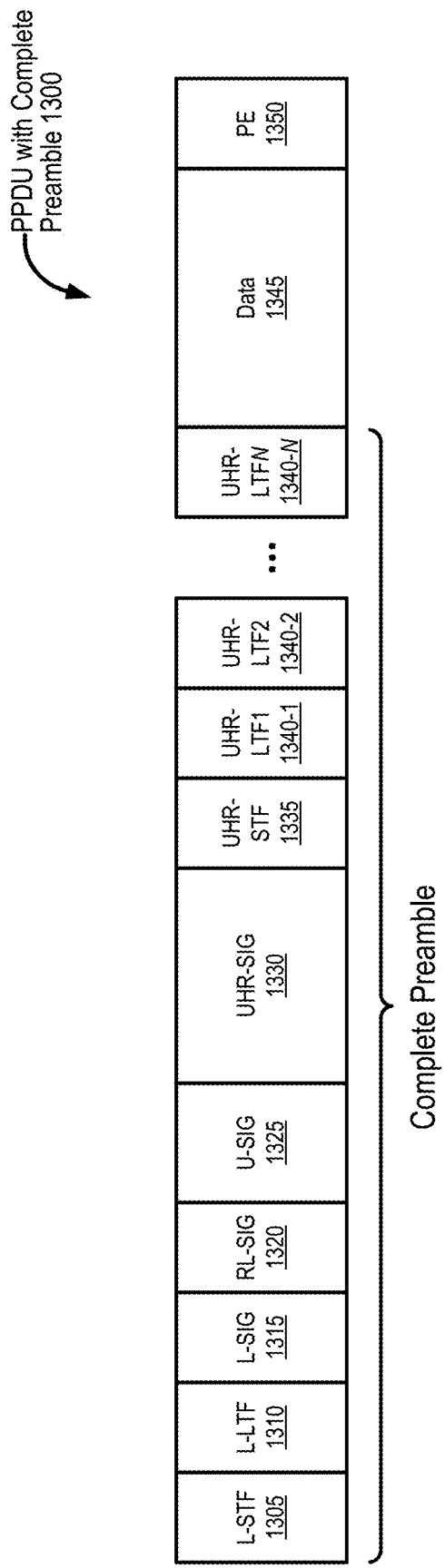
FIG. 13 is a diagram showing a PPDU format that includes a complete preamble, according to some embodiments.

FIG. 13 is a diagram showing a PPDU format that includes a complete preamble, according to some embodiments. The PPDU format shown in the diagram is an example of a beyond IEEE 802.11be PPDU format and the fields/subfields of the PPDU format should be interpreted in accordance with IEEE 802.11 wireless networking standards or drafts of the IEEE 802.11 wireless networking standards, unless indicated otherwise. It should be appreciated that the PPDU format and/or complete preamble format may be different for different embodiments (e.g., depending on the wireless networking standard being implemented).

As shown in the diagram, the PPDU includes a L-STF (legacy short training field) preamble field 1305, a L-LTF (legacy long training field) preamble field 1310, a L-SIG (legacy signal) preamble field 1315, a RL-SIG (repeated legacy signal) preamble field 1320, a U-SIG (universal signal) preamble field 1325, a UHR-SIG (ultra high reliability signal) preamble field 1330, a UHR-STF (ultra high reliability short training field) preamble field 1335, multiple UHR-LTF (ultra high reliability long training field) preamble fields 1340 (including UHR-LTF1 preamble field 1340-1, UHR-LTF2 preamble field 1340-2, and UHR-LTFN preamble field 1340-N, among others), a data field 1345, and a packet extension (PE) field 1350.

The L-STF preamble field 1305, L-LTF preamble field 1310, L-SIG preamble field 1315, RL-SIG preamble field 1320, U-SIG preamble field 1325, UHR-SIG preamble field 1330, UHR-STF preamble field 1335, and multiple UHR-LTF preamble fields 1340 may form a complete preamble.

In an embodiment, the format of a preemption PPDU is different depending on the transmission order of the preemption PPDU. For example, the first transmitted preemption PPDU (e.g., preemption PPDU #1 1200A shown in FIG. 12) in a sequence of preemption PPDUs may have a different PPDU format from the subsequent preemption PPDUs in the sequence (e.g., preemption PPDU #2 1200B, preemption PPDU #3 1200C, and preemption PPDU #4 1200D shown in FIG. 12). In particular, the first transmitted preemption PPDU may include a complete preamble, while the subsequent preemption PPDUs may only include a reduced preamble. Examples of preemption PPDU formats are now described.

FIG. 14 is a diagram showing a first example of a preemption PPDU format, according to some embodiments.

As shown in the diagram, the first preemption PPDU (preemption PPDU #1) may have the same format as a regular PPDU with a complete preamble (e.g., the PPDU format shown in FIG. 13), while the subsequent preemption PPDUs (preemption PPDU #2 to the last preemption PPDU) may have a PPDU format with a reduced preamble. In an embodiment, the reduced preamble has the same preamble fields as the complete preamble but omits the L-STF preamble field 1305 and the L-LTF preamble field 1310. Accordingly, the subsequent preemption PPDUs may include a L-SIG preamble field 1415, a RL-SIG preamble field 1420, a U-SIG preamble field 1425, a UHR-SIG preamble field 1430, a UHR-STF preamble field 1435, multiple UHR-LTF preamble fields 1440 (including UHR-LTFI preamble field 1440-1, UHR-LTF2 preamble field 1440-2, and UHR-LTFN preamble field 1440-N, among others), a data field 1445, and a PE field 1450. The L-SIG preamble field 1415, RL-SIG preamble field 1420, U-SIG preamble field 1425, UHR-SIG preamble field 1430, UHR-STF preamble field 1435, and multiple UHR-LTF preamble fields 1440 may form a reduced preamble.

A wireless device that receives such preemption PPDUs may obtain synchronization and channel estimation information from the L-STF preamble field 1305 and L-LTF preamble field 1310 of the first preemption PPDU (preemption PPDU #1) and reuse the obtained synchronization and channel estimation information when processing the subsequent preemption PPDUs (preemption PPDUs #2-Last). Reusing the synchronization and channel estimation information obtained from the first preemption PPDU when processing the subsequent preemption PPDUs may result in a small loss in frame decoding but this may be an acceptable tradeoff to reduce preamble overhead and improve throughput.

FIG. 15 is a diagram showing a second example of a preemption PPDU format, according to some embodiments.

As shown in the diagram, the first preemption PPDU (preemption PPDU #1) may have the same format as a regular PPDU with a complete preamble (e.g., the PPDU format shown in FIG. 13), while the subsequent preemption PPDUs (preemption PPDU #2 to the last preemption PPDU) may have a PPDU format with a reduced preamble. In an embodiment, if the information included in the L-SIG preamble field and the RL-SIG preamble field is identical for all preemption PPDUs, the reduced preamble has the same preamble fields as the reduced preamble shown in FIG. 14 but additionally omits the L-SIG preamble field 1415 and the RL-SIG preamble field 1420 (to avoid redundancy). Accordingly, the subsequent preemption PPDUs may include a U-SIG preamble field 1525, a UHR-SIG preamble field 1530, a UHR-STF preamble field 1535, multiple UHR-LTF preamble fields 1540 (including UHR-LTF1 preamble field 1540-1, UHR-LTF2 preamble field 1540-2, and UHR-LTFN preamble field 1540-N, among others), a data field 1545, and a PE field 1550. The U-SIG preamble field 1525, UHR-SIG preamble field 1530, UHR-STF preamble field 1535, and multiple UHR-LTF preamble fields 1540 may form a reduced preamble.

A wireless device that receives such preemption PPDUs may obtain information from the L-SIG preamble field 1315 and/or RL-SIG preamble field 1320 (the RL-SIG preamble field 1320 is a repetition of the L-SIG preamble field 135) of the first preemption PPDU (preemption PPDU #1) and reuse that information when processing the subsequent preemption PPDUs (preemption PPDUs #2-Last). For example, the L-SIG/RL-SIG preamble field may include a length field for indicating the total length of the preemption PPDUs (e.g., the length from the first preemption PPDU to the last preemption PPDU). A wireless device that receives preemption PPDUs may determine the total length of the preemption PPDUs based on information obtained from the length field of the L-SIG/RL-SIG preamble field of the first preemption PPDU (in this sense, the length information obtained from the L-SIG/RL-SIG preamble field is used/reused for determining the lengths of the subsequent preemption PPDUs). Also, the information included in the length field of the L-SIG/RL-SIG preamble field of the first preemption PPDU may help protect the preemption PPDUs from the transmission of other wireless devices.

Figure 16:
FIG. 16 is a diagram showing a third example of a preemption PPDU format, according to some embodiments.

FIG. 16 is a diagram showing a third example of a preemption PPDU format, according to some embodiments.

As shown in the diagram, the first preemption PPDU (preemption PPDU #1) may have the same format as a regular PPDU with a complete preamble (e.g., the PPDU format shown in FIG. 13), while the subsequent preemption PPDUs (preemption PPDU #2 to the last preemption PPDU) may have a PPDU format with a reduced preamble. In an embodiment, the reduced preamble has the same preamble fields as the reduced preamble shown in FIG. 15 but additionally omits the entire U-SIG preamble field 1525 or a portion thereof. Accordingly, in an embodiment, the subsequent preemption PPDUs include a portion of a U-SIG preamble field 1625 (e.g., a last portion (e.g., last OFDM symbol) of a full U-SIG preamble field, which may also be referred to as "Last U-SIG"), a UHR-SIG preamble field 1630, a UHR-STF preamble field 1635, multiple UHR-LTF preamble fields 1640 (including UHR-LTF1 preamble field 1640-1, UHR-LTF2 preamble field 1640-2, and UHR-LTFN preamble field 1640-N, among others), a data field 1645, and a PE field 1650. The portion of the U-SIG preamble field 1625, UHR-SIG preamble field 1630, UHR-STF preamble field 1635, and multiple UHR-LTF preamble fields 1640 may form a reduced preamble. The portion of the U-SIG preamble field 1625 may include a preemption indication indicating that the PPDU is a preemption PPDU and possibly additional information/parameters.

In another embodiment, the subsequent preemption PPDUs include a UHR-SIG preamble field 1630, a UHR-STF preamble field 1635, multiple UHR-LTF preamble fields 1640 (including UHR-LTF1 preamble field 1640-1, UHR-LTF2 preamble field 1640-2, and UHR-LTEN preamble field 1640-N, among others), a data field 1645, and a PE field 1650. The UHR-SIG preamble field 1630, UHR-STF preamble field 1635, and multiple UHR-LTF preamble fields 1640 may form a reduced preamble. In such an embodiment, the UHR-SIG preamble field 1630 may include a preemption indication indicating that the PPDU is a preemption PPDU and possibly additional information/parameters.

A complete U-SIG preamble field may include two OFDM symbols. The two OFDM symbols may include various information such as information regarding PHY version identifier, bandwidth, uplink/downlink, BSS color, TXOP, PPDU type and compression mode, punctured channel information, UHR-SIG modulation coding scheme (MCS), number of UHR-SIG symbols, cyclic redundancy check (CRC), and/or tail (e.g., as defined in drafts of the IEEE 802.11be wireless networking standard). Since most of this information should be the same for all preemption PPDUs, the first preemption PPDU may include the complete U-SIG preamble field (both OFDM symbols) and the subsequent preemption PPDUs may only include one OFDM symbol (e.g., the second OFDM symbol of the U-SIG preamble field, which may also be referred to as the "Last U-SIG") that includes a preemption indication indicating that the PPDU is a preemption PPDU (e.g., which indicates that the PPDU will be followed by a xIFS interval during which preemption is allowed). In such an embodiment, each subsequent preemption PPDU may include its own CRC and encoding mechanism with the reduced number of bits of the U-SIG preamble field. In an embodiment, if the preemption indication is included in the UHR-SIG preamble field, then the reduced preamble may omit the U-SIG field entirely.

A wireless device that receives such preemption PPDUs may obtain information from the U-SIG preamble field 1325 of the first preemption PPDU (preemption PPDU #1) and reuse that information when processing the subsequent preemption PPDUs (preemption PPDUs #2-Last). For example, the wireless device may reuse information obtained from the U-SIG preamble field 1325 of the first preemption PPDU related to PHY version identifier, bandwidth, uplink/downlink, BSS color, TXOP, PPDU type and compression mode, punctured channel information, UHR-SIG MCS, number of UHR-SIG symbols, CRC, and/or tail. The CRC value included in the U-SIG preamble field is calculated based on other fields included in the U-SIG preamble field. Thus, if the information included in the other fields of the U-SIG preamble field is the same for all preemption PPDUs, the CRC value should also be the same and thus need not be repeated.

Figure 17:
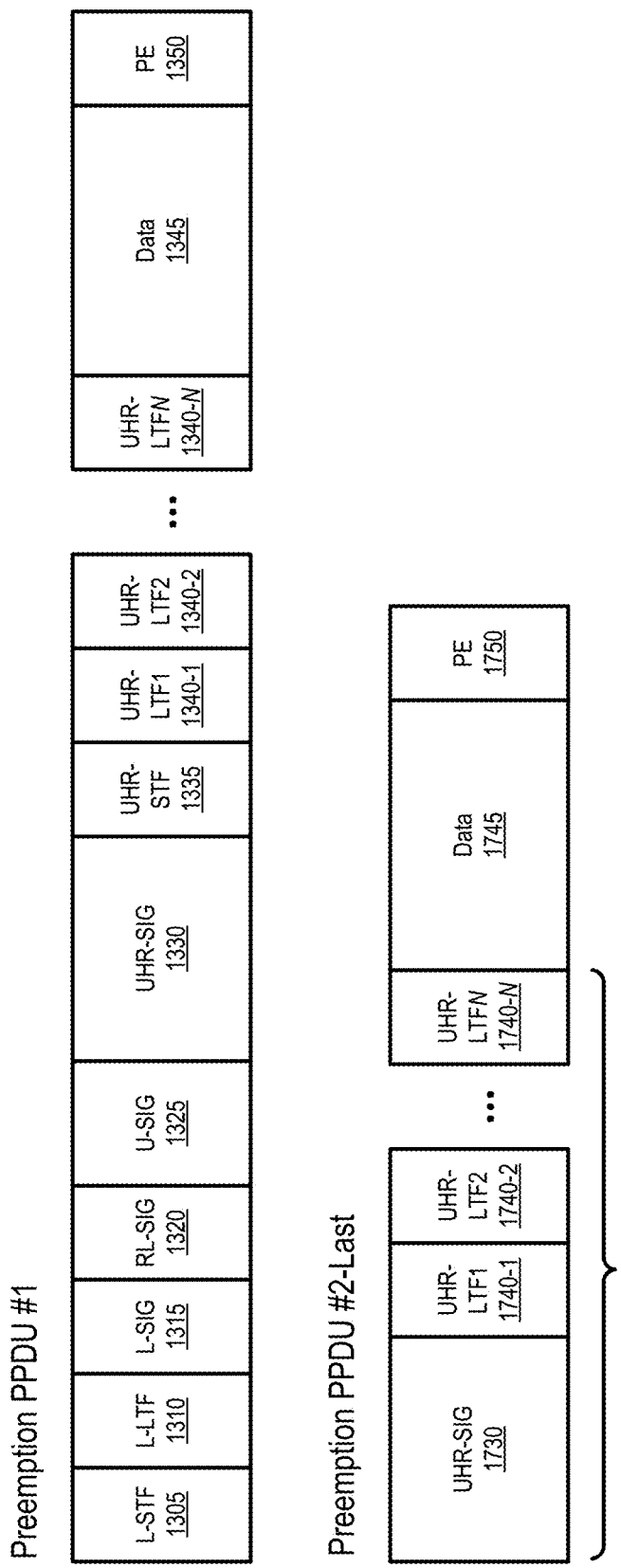
FIG. 17 is a diagram showing a fourth example of a preemption PPDU format, according to some embodiments.

FIG. 17 is a diagram showing a fourth example of a preemption PPDU format, according to some embodiments.

As shown in the diagram, the first preemption PPDU (preemption PPDU #1) may have the same format as a regular PPDU with a complete preamble (e.g., the PPDU format shown in FIG. 13), while the subsequent preemption PPDUs (preemption PPDU #2 to the last preemption PPDU) may have a PPDU format with a reduced preamble. In an embodiment, the reduced preamble has the same preamble fields as the reduced preamble shown in FIG. 16 but additionally omits the UHR-STF preamble field 1635. Accordingly, the subsequent preemption PPDUs may include a UHR-SIG preamble field 1730 and multiple UHR-LTF preamble fields 1740 (including UHR-LTF1 preamble field 1740-1, UHR-LTF2 preamble field 1740-2, and UHR-LTFN preamble field 1740-N, among others), a data field 1745, and a PE field 1750. The UHR-SIG preamble field 1730 and multiple UHR-LTF preamble fields 1740 may form a reduced preamble. Since all of the preemption PPDUs are transmitted by the same wireless device with a fixed time gap (e.g., xIFS interval) between PPDU transmissions, additional automatic gain control (AGC) may not be needed in the subsequent preemption PPDUs, and so the UHR-STF preamble field may be omitted in the subsequent preemption PPDUs.

A wireless device that receives such preemption PPDUs may obtain information from the UHR-STF preamble field 1335 of the first preemption PPDU (preemption PPDU #1) to perform AGC for the first preemption PPDU, but may process the subsequent preemption PPDUs (preemption PPDUs #2-Last) without performing additional AGC. Since the preemption PPDUs are transmitted by the same transmitter with fixed time gap between PPDU transmissions, the received power of the preemption PPDUs is expected to be almost the same for all preemption PPDUs. Thus, the same AGC that was applied to the first preemption PPDU can be applied to the subsequent preemption PPDUs.

Figure 18:
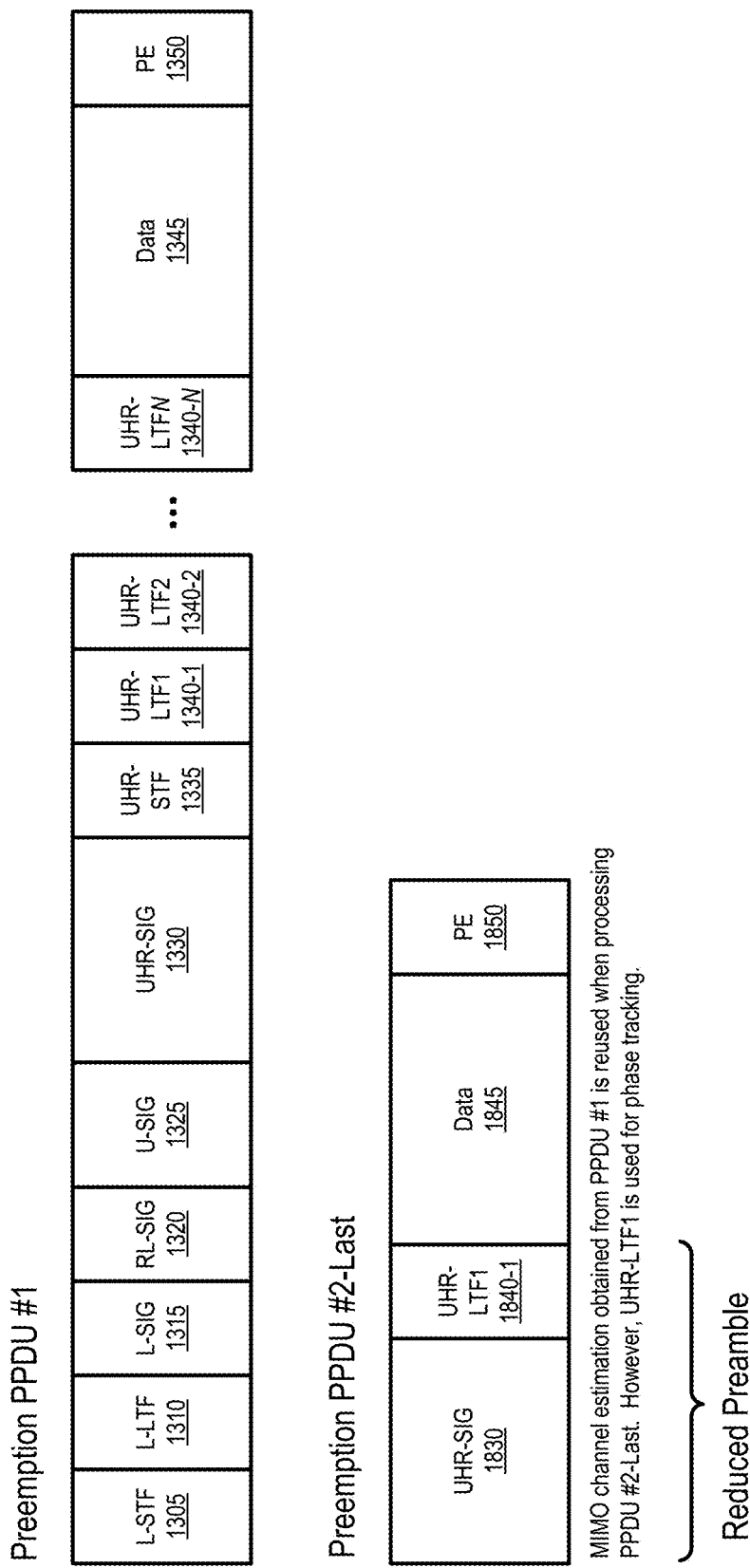
FIG. 18 is a diagram showing a fifth example of a preemption PPDU format, according to some embodiments.

FIG. 18 is a diagram showing a fifth example of a preemption PPDU format, according to some embodiments.

As shown in the diagram, the first preemption PPDU (preemption PPDU #1) may have the same format as a regular PPDU with a complete preamble (e.g., the format shown in FIG. 13), while the subsequent preemption PPDUs (preemption PPDU #2 to the last preemption PPDU) may have a PPDU format with a reduced preamble. In an embodiment, the reduced preamble has the same preamble fields as the reduced preamble shown in FIG. 17 but additionally omits the UHR-LTF2 to UHR-LTFN preamble fields. Accordingly, the subsequent preemption PPDUs may include a UHR-SIG preamble field 1830 and a UHR-LTF1 preamble field 1840-1 (but without UHR-LTF2~UHR-LTFN preamble fields), a data field 1845, and a PE field 1850. The UHR-SIG preamble field 1830 and UHR-LTF1 preamble field 1840-1 may form a reduced preamble. The reduced preamble may keep one UHR-LTF preamble field (e.g., UHR-LTF1 preamble field 1840-1) for phase tracking purposes.

A wireless device that receives such preemption PPDUs may obtain multiple input multiple output (MIMO) channel estimation information from the multiple UHR-LTF preamble fields 1340 of the first preemption PPDU (preemption PPDU #1) and reuse that information when processing the subsequent preemption PPDUs (preemption PPDUs #2-Last). The wireless device may use information obtained from the UHR-LTF1 preamble field 1840-1 of each of the subsequent preemption PPDUs for phase tracking.

In an embodiment, since the source and destination of all of the preemption PPDUs are the same, if the first preemption PPDU is transmitted with a beamforming matrix for enhanced performance, the same beamforming matrix can be applied to the subsequent preemption PPDUs.

In an embodiment, when transmission of preemption PPDUs resumes after being preempted by a low latency data transmission, the first preemption PPDU that is transmitted following the preemption is regarded as the first PPDU in the sequence and thus includes a complete preamble and the subsequently transmitted preemption PPDUs may include a reduced preamble.

In an embodiment, to further reduce overhead, the PE field is omitted from all preemption PPDUs (which reduces the size of preemption PPDUs) except the last preemption PPDU in the sequence.

By transmitting one preemption PPDU with a complete preamble followed by subsequent preemption PPDUs having a reduce preamble, the preamble overhead can be reduced and overall throughput can be increased in the wireless network, while still allowing the subsequent preemption PPDUs to be processed properly (e.g., by using information obtained from the complete preamble of the first preemption PPDU) and allowing for low latency preemption transmissions (e.g., during the xIFS interval between PPDU transmissions).

Figure 19:
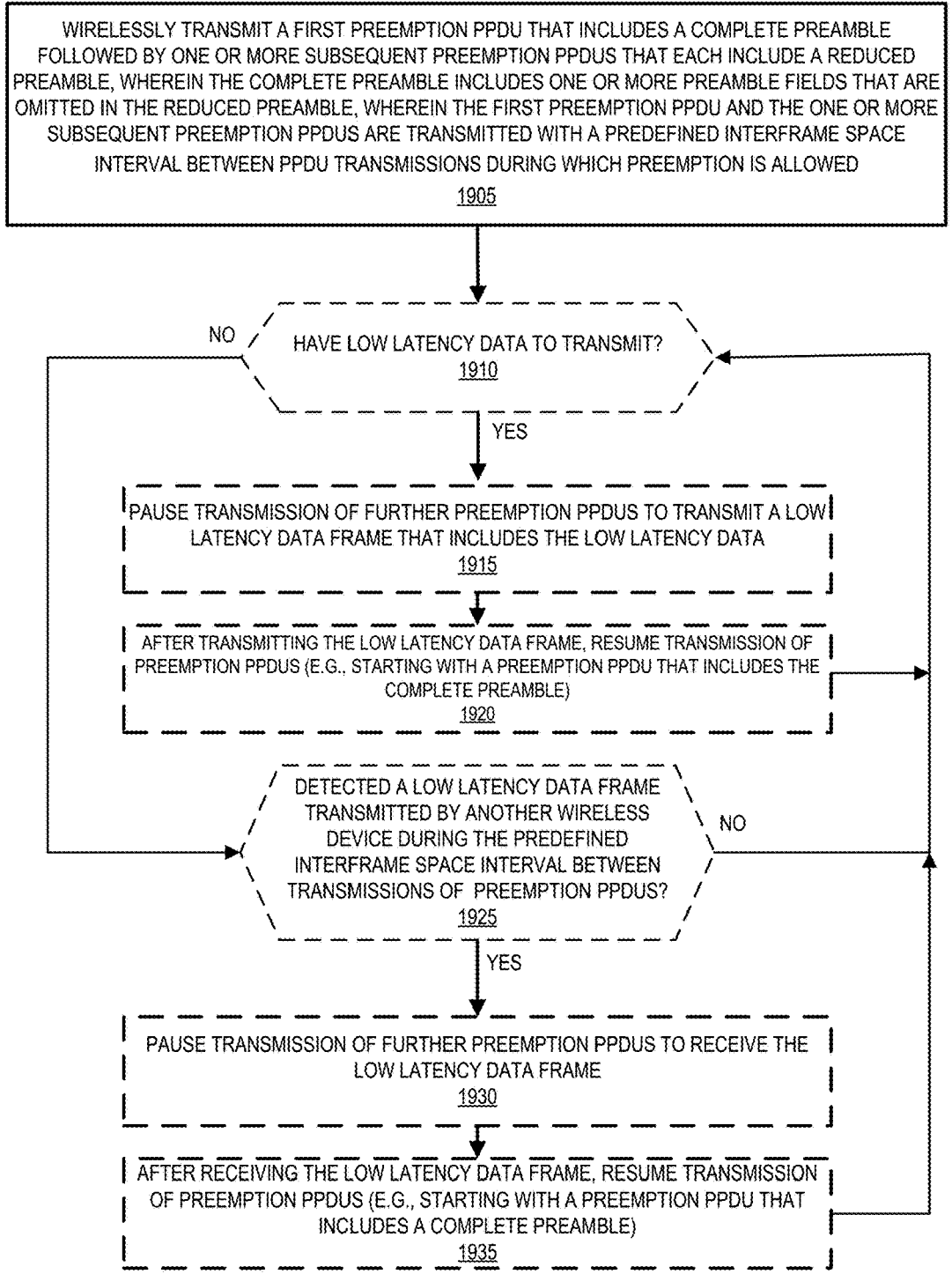
FIG. 19 is a flowchart of a method for transmitting preemption PPDUs with low preamble overhead, according to some embodiments.

Turning now to FIG. 19, a method 1900 will be described for transmitting preemption PPDUs with low preamble overhead, in accordance with an example embodiment. The method 1900 may be performed by a wireless device in a wireless network (e.g., wireless device 104).

Additionally, although shown in a particular order, in some embodiments the operations of the method 1900 (and the other methods shown in the other figures) may be performed in a different order. For example, although the operations of the method 1900 are shown in a sequential order, some of the operations may be performed in partially or entirely overlapping time periods.

At operation 1905, the wireless device wirelessly transmits a first preemption PPDU that includes a complete preamble followed by one or more subsequent preemption PPDUs that each include a reduced preamble, wherein the complete preamble includes one or more preamble fields that are omitted in the reduced preamble, wherein the first PPDU and the one or more subsequent PPDUs are transmitted with a predefined interframe space interval (e.g., xIFS interval) between PPDU transmissions during which preemption is allowed.

In an embodiment, the one or more preamble fields that are included in the complete preamble but omitted in the reduced preamble include a L-STF preamble field and a L-LTF preamble field. In an embodiment, the one or more preamble fields that are included in the complete preamble but omitted in the reduced preamble further include a L-SIG preamble field and a RL-SIG preamble field. In an embodiment, the one or more preamble fields that are included in the complete preamble but omitted in the reduced preamble further include a U-SIG preamble field or a portion (e.g., an OFDM symbol or subfield) of the U-SIG preamble field. In an embodiment, the one or more preamble fields that are included in the complete preamble but omitted in the reduced preamble further include a UHR-STF preamble field. In an embodiment, the one or more preamble fields that are included in the complete preamble but omitted in the reduced preamble further include one or more UHR-LTF preamble fields. In an embodiment, the reduced preamble includes a single UHR-LTF preamble field for phase tracking.

In an embodiment, the predefined interframe space interval is longer than a SIFS interval but shorter than a DIFS interval. In an embodiment, the predefined interframe space interval has a duration that that is a multiple of an OFDM symbol duration.

In an embodiment, a last one of the one or more subsequent preemption PPDUs includes a PE field but the first PPDU and others of the one or more subsequent preemption PPDUs do not include the a PE field.

In an embodiment, the wireless device perform operations 1910-1935 while transmitting preemption PPDUs. In an embodiment, at operation 1910, the wireless device determines whether it has low latency data to transmit (while transmitting the preemption PPDUs). If the wireless device has low latency data to transmit, then the flow moves to operation 1915. Otherwise, if the wireless device does not have low latency data to transmit, then the flow moves to operation 1925.

In an embodiment, at operation 1915, the wireless device pauses transmission of further preemption PPDUs to transmit a low latency data frame that includes the low latency data.

In an embodiment, at operation 1920, after transmitting the low latency data frame, the wireless device resumes transmission of preemption PPDUs (e.g., starting with a preemption PPDU that includes the complete preamble followed by subsequent preemption PPDUs that each include the reduced preamble).

In an embodiment, at operation 1925, the wireless device determines whether it has detected a low latency data frame transmitted by another wireless device during the predefined interframe space interval between transmissions of preemption PPDUs. If the wireless has detected a low latency data frame, the flow moves to operation 1930. Otherwise, if the wireless device has not detected a low latency data frame, the flow moves to operation 1910.

In an embodiment, at operation 1930, the wireless device pauses transmission of further preemption PPDUs to receive the low latency data frame.

In an embodiment, at operation 1935, after receiving the low latency data frame, the wireless device resumes transmission of preemption PPDUs (e.g., starting with a preemption PPDU that includes the complete preamble followed by subsequent preemption PPDUs that each include the reduced preamble).

Turning now to FIG. 20, a method 2000 will be described for processing preemption PPDUs, in accordance with an example embodiment. The method 2000 may be performed by a wireless device in a wireless network (e.g., wireless device 104).

At operation 2005, the wireless device wirelessly receives a first preemption PPDU that includes a complete preamble followed by one or more subsequent preemption PPDUs that each include a reduced preamble, wherein the complete preamble includes one or more preamble fields that are omitted in the reduced preamble, wherein the first preemption PPDU and the one or more subsequent preemption PPDUs were transmitted with a predefined interframe space interval between PPDU transmissions to allow preemption.

At operation 2010, the wireless device processes the first preemption PPDU and the one or more subsequent preemption PPDUs. In an embodiment, the processing of operation 2010 involves performing one or more of operations 2015-2035.

In an embodiment, if the complete preamble includes the L-STF preamble field and L-LTF preamble field but the reduced preamble omits the L-STF preamble field and L-LTF preamble field, at operation 2015, the wireless device processes the one or more subsequent preemption PPDUs using synchronization and channel estimation information obtained from the L-STF preamble field and L-LTF preamble field included in the complete preamble of the first preemption PPDU.

In an embodiment, if the complete preamble includes the L-SIG preamble field (and RL-SIG field) but the reduced preamble omits the L-SIG preamble field (and the RL-SIG field), at operation 2020, the wireless device processes the one or more subsequent preemption PPDUs using information obtained from the L-SIG preamble field included in the complete preamble of the first preemption PPDU.

In an embodiment, if the complete preamble includes the U-SIG preamble field but the reduced preamble omits the U-SIG preamble field or omits a portion of the U-SIG preamble field, at operation 2025, the wireless device processes the one or more subsequent preemption PPDUs using information obtained from the U-SIG preamble field or the portion of the U-SIG preamble field included in the complete preamble.

In an embodiment, if the complete preamble includes the UHR-STF preamble field but the reduced preamble omits the UHR-STF preamble field, at operation 2030, the wireless device processes the one or more subsequent preemption PPDUs without performing additional AGC (e.g., apply the same AGC that was applied to the first preemption PPDU to the one or more subsequent preemption PPDUs).

In an embodiment, if the complete preamble includes a plurality of UHR-LTF preamble fields but the reduced preamble omits one or more of the plurality of UHR-LTF preamble fields, at operation 2035, the wireless device processes the one or more subsequent preemption PPDUs using MIMO channel estimation information obtained from one or more of the plurality of UHR-LTF preamble fields included in the complete preamble. In an embodiment, the reduced preamble includes a single UHR-LTF preamble field for phase tracking.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a wireless device to allow preemption in a wireless network, comprising:

wirelessly transmitting a first preemption physical layer protocol data unit (PPDU) that includes a complete preamble followed by one or more subsequent preemption PPDUs that each include a reduced preamble, wherein the complete preamble includes one or more preamble fields that are omitted in the reduced preamble, wherein the first PPDU and the one or more subsequent preemption PPDUs are transmitted with a predefined interframe space interval between PPDU transmissions during which preemption is allowed;

wherein the one or more preamble fields that are included in the complete preamble but omitted in the reduced preamble include a legacy short training field (L-STF) preamble field and a legacy long training field (L-LTF) preamble field, wherein the one or more subsequent preemption PPDUs are to be processed using synchronization and channel estimation information obtained from the L-STF preamble field and the L-LTF preamble field included in the complete preamble.

2. The method of claim 1, wherein the one or more preamble fields that are included in the complete preamble but omitted in the reduced preamble further include a legacy signal (L-SIG) preamble field and a repeated legacy signal (RL-SIG) preamble field.

3. The method of claim 2, wherein the one or more preamble fields that are included in the complete preamble but omitted in the reduced preamble further include a universal signal (U-SIG) preamble field or a portion of the U-SIG preamble field.

4. The method of claim 3, wherein the one or more preamble fields that are included in the complete preamble but omitted in the reduced preamble further include an ultra high reliability short training field (UHR-STF) preamble field.

5. The method of claim 4, wherein the one or more preamble fields that are included in the complete preamble but omitted in the reduced preamble further include one or more ultra high reliability long training field (UHR-LTF) preamble fields, wherein the reduced preamble includes a single UHR-LTF preamble field for phase tracking.

6. The method of claim 1, further comprising:
detecting a low latency data frame transmitted by another wireless device during the predefined interframe space interval between PPDUs; and
responsive to detecting the low latency data frame, pausing transmission of further preemption PPDUs to receive the low latency data frame.

7. The method of claim 6, further comprising:
after receiving the low latency data frame, resuming transmission of preemption PPDUs by transmitting a second preemption PPDU that includes the complete preamble followed by one or more subsequent preemption PPDUs that each include the reduced preamble.

8. The method of claim 1, further comprising:
determining that the wireless device has low latency data to transmit; and
responsive to determining that the wireless device has low latency data to transmit, pausing transmission of further preemption PPDUs to transmit a low latency data frame that includes the low latency data.

9. The method of claim 8, further comprising:
after transmitting the low latency data frame, resuming transmission of preemption PPDUs by transmitting a second preemption PPDU that includes the complete preamble followed by one or more subsequent preemption PPDUs that each include the reduced preamble.

10. The method of claim 1, wherein the predefined interframe space interval is longer than a short interframe space (SIFS) interval but shorter than a distributed coordination function interframe space (DIFS) interval.

11. The method of claim 10, wherein the predefined interframe space interval has a duration that that is a multiple of an orthogonal frequency division multiplexing (OFDM) symbol duration.

12. The method of claim 1, wherein a last one of the one or more subsequent preemption PPDUs includes a packet extension (PE) field but the first PPDU and others of the one or more subsequent preemption PPDUs do not include the packet extension (PE) field.

13. A method performed by a wireless device to process preemption physical layer protocol data units (PPDUs), the method comprising:
wirelessly receiving a first preemption PPDU that includes a complete preamble followed by one or more subsequent preemption PPDUs that each include a reduced preamble, wherein the complete preamble includes one or more preamble fields that are omitted in the reduced preamble, wherein the first PPDU and the one or more subsequent preemption PPDUs were transmitted with a predefined interframe space interval between PPDU transmissions to allow preemption; and
processing the first preemption PPDU and the one or more subsequent preemption PPDUs;
wherein the one or more preamble fields that are included in the complete preamble but omitted in the reduced preamble include a legacy short training field (L-STF) preamble field and a legacy long training field (L-LTF) preamble field, wherein the one or more subsequent preemption PPDUs are processed using synchronization and channel estimation information obtained from the L-STF preamble field and the L-LTF preamble field included in the complete preamble.

14. The method of claim 13, wherein the one or more preamble fields that are included in the complete preamble but omitted in the reduced preamble further include a legacy signal (L-SIG) preamble field and a repeated legacy signal (RL-SIG) preamble field, wherein the one or more subsequent preemption PPDUs are processed using information obtained from the L-SIG preamble field included in the complete preamble.

15. The method of claim 14, wherein the one or more preamble fields that are included in the complete preamble but omitted in the reduced preamble further include a universal signal (U-SIG) preamble field or a portion of the U-SIG preamble field, wherein the one or more subsequent preemption PPDUs are processed using information obtained from the U-SIG preamble field or the portion of the U-SIG preamble field included in the complete preamble.

16. The method of claim 15, wherein the one or more preamble fields that are included in the complete preamble but omitted in the reduced preamble further include an ultra high reliability short training field (UHR-STF) preamble field, wherein the one or more subsequent preemption PPDUs are processed without performing additional automatic gain control (AGC).

17. The method of claim 16, wherein the one or more preamble fields that are included in the complete preamble but omitted in the reduced preamble further include one or more ultra high reliability long training field (UHR-LTF) preamble fields, wherein the one or more subsequent preemption PPDUs are processed using multiple input multiple output (MIMO) channel estimation information obtained from the one or more UHR-LTF preamble fields included in the complete preamble.

18. The method of claim 17, wherein the reduced preamble includes a single UHR-LTF preamble field for phase tracking.

19. A wireless device to allow preemption in a wireless network, the wireless device comprising:
a radio frequency transceiver;
a memory device storing a set of instructions; and
a processor coupled to the memory device, wherein the set of instructions when executed by the processor causes the wireless device to:
wirelessly transmit a first preemption physical layer protocol data unit (PPDU) that includes a complete preamble followed by one or more subsequent preemption PPDUs that each include a reduced preamble, wherein the complete preamble includes one or more preamble fields that are omitted in the reduced preamble, wherein the first PPDU and the one or more subsequent preemption PPDUs are transmitted with a predefined interframe space interval between PPDU transmissions during which preemption is allowed;

wherein the one or more preamble fields that are included in the complete preamble but omitted in the reduced preamble include a legacy short training field (L-STF) preamble field and a legacy long training field (L-LTF) preamble field, wherein the one or more subsequent preemption PPDUs are to be processed using synchronization and channel estimation information obtained from the L-STF preamble field and the L-LTF preamble field included in the complete preamble.

\* \* \* \* \*